Nov. 3, 1953

V. J. SKANTZE 2,658,116

TELEPHONE HANDSET HOLDER

Filed Feb. 15, 1951

INVENTOR.

Vincent J. Skantze

BY

Burton & Parker

ATTORNEYS

Patented Nov. 3, 1953

2,658,116

UNITED STATES PATENT OFFICE 2,658,116

TELEPHONE HANDSET HOLDER

Vincent J. Skantze, Detroit, Mich.

Application February 15, 1951, Serial No. 211,069

2 Claims. (Cl. 179—146)

This invention relates to telephones and more particularly to an attachment which may be detachably secured to a telephone stand for the purpose of temporarily holding the telephone hand set.

An important object of the invention is to provide an improved rest or support for the telephone hand set or receiver which is shaped in a novel manner for quick attachment and detachment from a telephone stand and which is constructed in a novel manner from a single length of wire. Another important object of the invention is to provide a support of this character formed from a single strand or length of spring wire and shaped at one end for releasable interlocking engagement with a part of the telephone stand and shaped at the other end to support the telephone hand set on substantially the same level as the cradle of the telephone stand. A further important object of the invention is to provide an attachment of this character which is economical to produce and which when mounted on a telephone stand is relatively inconspicuous.

Figure 1:
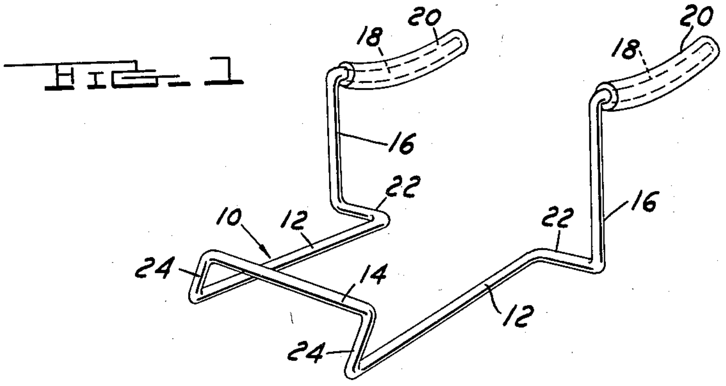
Figure 2:
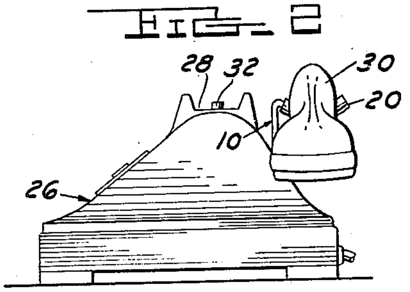
Figure 3:
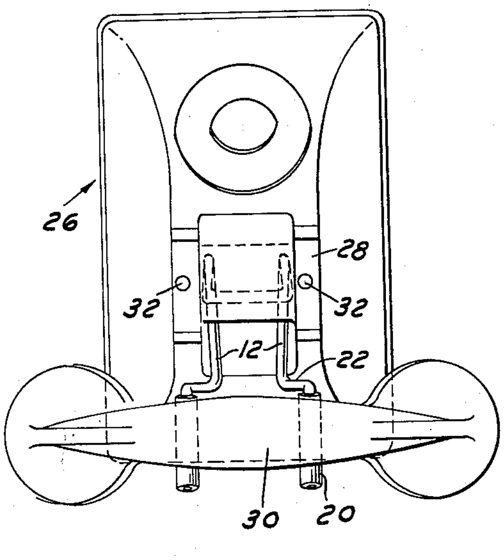
Figure 4:
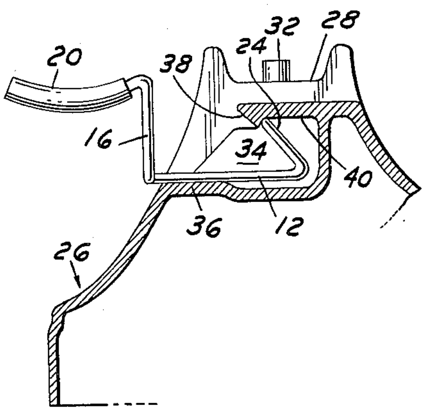

Various other objects, advantages and meritorious features of the invention will become more fully apparent from the following specification, appended claims and accompanying drawings, wherein:

Fig. 1 is a perspective view of the attachment,

Fig. 2 is a side elevation of a telephone stand showing the attachment thereon and a telephone hand set supported thereby, Fig. 3 is a top plan view of a telephone stand showing the attachment mounted thereon and illustrating the position assumed by the hand set when supported by the attachment, and Fig. 4 is an enlarged vertical sectional view through a telephone stand illustrating the manner of interlockingly supporting the attachment thereon.

The attachment is economically formed from a single length or strand of spring wire bent generally into a U-shaped formation and shaped at the closed end of the U for interlocking engagement with the stand and shaped at the open end of the U to receive and support the telephone hand set or combination receiver and transmitter unit of the telephone.

Referring particularly to Fig. 1, the U-shaped attachment is formed from a single length of spring wire generally indicated at 10. This is bent as shown into a generally U-shaped frame including two side leg portions of similar formation and a closed end portion. Each side leg is similarly divided longitudinally into a horizontal inner section 12 adjacent to the closed end 14 of the wire frame, an intermediate vertical section 16, and an outer substantially horizontal section 18 which is disposed at a level above that of the inner section 12.

The outer end sections 18—18 of the wire frame are similarly concavely curved downwardly, as shown in Figs. 1 and 4, to form a saddle across which the hand set of a telephone may be supported. To prevent metallic contact of the hand set with the wire frame, it is preferred to cover or enclose each outer end section 18 of the frame with a sheath 20 of resilient material. Preferably, the outer end sections 18—18 of the wire frame are spaced apart a greater distance than the horizontal sections 12—12 thereof, as shown in Fig. 1. To accomplish this purpose, each vertical section 16 of the leg of the U is connected to the inner section 12 by means of a short jogging section 22 which extends horizontally and at right angles to the section 12 and joins the bottom end of the vertical section 16 to the outer end of the inner section 12 in the manner illustrated in Fig. 1.

The closed end 14 of the wire frame is shaped in a novel manner to releasably engage a part of the telephone stand and secure the attachment thereto against accidental dislodgment. As shown in Fig. 1, the closed end 14 extends in a straight line and forms a transverse bar. It is supported in elevated position above the inner sections 12—12 by two similarly formed upwardly and outwardly inclined wire sections 24—24. The two sections 24—24 are reversely bent with respect to the inner sections 12—12 and together with the closed end section 14 form a hook which is interlockingly engageable in a recess formed in the conventional telephone stand. The length and inclination of the two short sections 24—24 are so gauged as to dispose the bar 14 at a height intermediate the inner and outer sections of the wire frame and bring the bar into engagement with a lip portion depending within a recess of the telephone stand.

Referring particularly to Figs. 3 and 4, the stand of a conventional French type of telephone is generally indicated at 26 and includes on the upper end thereof a cradle 28 in which the hand set or combination telephone receiver and transmitter 30 is normally located when the telephone is not in use. Upwardly projecting from the cradle are two depressible buttons 32—32 which when the hand set is received therein move downwardly and break the telephone circuit. The conventional telephone stand of this type is provided with a rearwardly opening recess 34 located below the level of the cradle 28 and partially thereunder, as shown in Fig. 4. The normal purpose of this recess is to receive the fingers of the hand for lifting and moving the stand. The recess includes a horizontal base portion 36 located adjacent to the entrance thereof and a lip 38 which depends from the overhanging top wall 40 of the recess. The lip provides a finger grip for the hand entering the recess and in the use of this attachment it functions to interlockingly support the attachment in proper position within the recess. To readily accommodate the closed end of the wire frame within the recess 34, the leg sections 12—12 are spaced apart from one another a distance slightly less than the width of the recess and they may extend at a slight converging angle, as shown in Fig. 3.

In the use of this attachment, the closed end of the U shaped wire frame is first inserted at an inclined angle into the recess 34 of the telephone stand and when substantially fully inserted therewithin it is rocked downwardly to bring the closed end section or bar 14 upwardly against the inside surface of the depending lip 38 as shown in Fig. 4. At the same time the bar 14 engages the lip the two horizontal inner sections 12—12 of the wire frame rest on the horizontal surface 36 at the entrance of the recess. In this position, the attachment is supportingly projected rearwardly from the stand. The two vertical sections 16—16 of the wire frame are of such heighth, as indicated in Figs. 2 and 4, to dispose the saddle formed thereby at substantially the same level as that of the cradle 28. Thus when it is necessary to temporarily put down the hand set 30 of the telephone on anything other than the cradle 28, it can be conveniently supported upon the saddle sections 18—18 of the wire frame. The resiliency of the wire frame plus the covering 20 on the outer end sections thereof eliminates the production of any discordant noises in the telephone when the hand set is placed on the attachment.

Formed from a single strand or length of spring wire, the attachment can be produced at low cost and easily modified, if necessary, to accommodate itself to any change in design of the telephone stand. The wire frame is light in weight, and relatively inconspicuous when mounted on a telephone stand. For that latter purpose, it may be painted the same color as the stand.

What I claim is:

1. For a French type of telephone stand having a cradle for holding a telephone hand set and further having a side opening recess below the cradle, a demountable attachment therefor for temporarily supporting the hand set and composed of a single length of spring wire bent generally into a U-shaped formation, the two legs of the U being similarly formed and each divided longitudinally into an inner wire section and an outer wire section and an intermediate wire section connecting the inner and outer wire sections together, the inner wire sections of the legs extending substantially straight and in substantially parallel relationship spaced apart sufficient to enter the recess of the telephone stand and rest on the bottom thereof, the outer wire sections of the legs being similarly concavely formed and in substantially parallel spaced apart relation and cooperating together to form a cradle upon which the hand set is supportable, the connecting intermediate sections of the legs extending substantially vertically and connected at their lower ends to the inner wire sections and connected at their upper ends to the outer wire sections and disposing the latter in vertically elevated relation to the inner sections, the closed end of the U being constituted by a substantially straight wire section forming a transverse bar, and short backwardly and upwardly bent wire sections connecting the opposite ends of the transverse bar to the rear ends of the inner straight wire sections of the legs and positioning the bar on a level thereabove but no higher than the level of the cradle formed by the outer wire sections, said bar being so positioned with respect to the inner straight wire sections of the attachment that when these sections are inserted into the recess of the telephone stand the bar is abuttingly engageable with the underside of the top wall of the recess and cooperates with the inner wire sections to support the attachment in laterally projecting relation to the telephone stand.

2. For a telephone stand including a cradle adapted to break the telephone circuit when the telephone hand set is placed therein and provided with a rearwardly opening recess below the cradle having a depending lip therewithin, an attachment for temporarily supporting the telephone hand set formed from a single length of spring wire bent into a general U-shaped frame, the legs of the U-shaped frame each being similarly formed and longitudinally divided into a substantially horizontal inner section adjacent to the closed end of the U and a substantially vertical section connected at its lower end to the outer end of the inner section and a substantially horizontal outer section connected to the upper end of the vertical section, said outer section of each leg of the wire frame having a concave curvature and cooperating with the other outer section to form a saddle upon which the hand set is supportable, the closed end of the U-shaped frame extending straight and forming a transverse bar, and short upwardly and backwardly inclined wire sections connecting the opposite ends of the bar to the inner sections and disposing the bar at a level above the inner sections but below the level of the outer sections, said inner sections together with the bar being insertable into the recess of the stand so as to abuttingly engage the bar with the inner side of the depending lip of the recess to thereby projectionably support the frame on the telephone stand.

VINCENT J. SKANTZE.

References Cited in the file of this patent

UNITED STATES PATENTS

| Number | Name | Date |
|---|---|---|
| 2,036,010 | Atkins | Mar. 31, 1936 |
| 2,320,838 | Watson | June 1, 1943 |
| 2,608,622 | Von Gunten | Aug. 26, 1952 |

FOREIGN PATENTS

| Number | Country | Date |
|---|---|---|
| 438,548 | Germany | Dec. 20, 1926 |